(No Model.)

H. H. BELKNAP.
TREE PROTECTOR.

No. 569,082. Patented Oct. 6, 1896.

Witnesses:
Harry Holgate
S. T. Williamson

Inventor:
Harry H. Belknap
by Geo. H. Holgate
Attorney

UNITED STATES PATENT OFFICE.

HARRY H. BELKNAP, OF PHILADELPHIA, PENNSYLVANIA.

TREE-PROTECTOR.

SPECIFICATION forming part of Letters Patent No. 569,082, dated October 6, 1896.

Application filed September 5, 1895. Serial No. 561,517. (No model.)

*To all whom it may concern:*

Be it known that I, HARRY H. BELKNAP, a citizen of the United States, residing at Philadelphia, in the county of Philadelphia and State of Pennsylvania, have invented certain new and useful Improvements in Tree-Protectors, of which the following is a specification.

My invention relates to a new and useful improvement in tree-protectors, and has for its object to prevent the passage of insects, such as caterpillars, up the trunk of a tree to the branches and leaves thereof, and which shall be inexpensive and neat in appearance.

With these ends in view my invention consists in the details of construction and combination of elements hereinafter set forth, and then specifically designated by the claims.

In order that those skilled in the art to which this invention appertains may understand how to make and use the same, I will describe its construction and operation in detail, referring by number to the accompanying drawings, forming a part of this specification, and in which—

Figure 1:
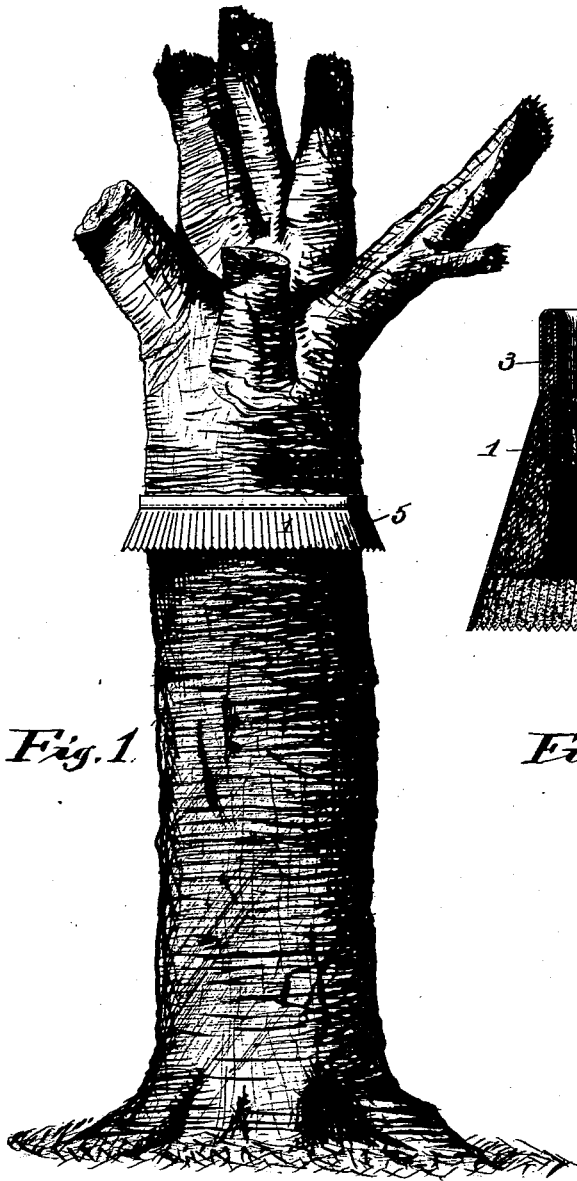
Figure 2:
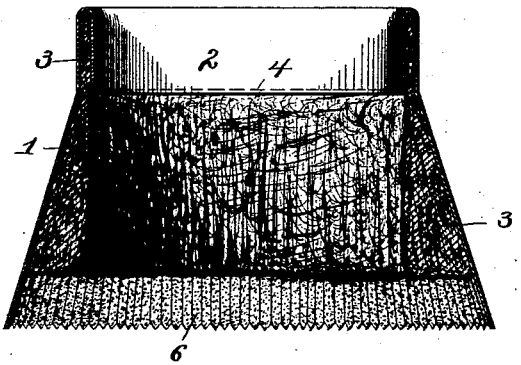

Figure 1 represents my improvement applied to a tree; and Fig. 2, a central section thereof, illustrating the mode of construction.

1 is a housing of oiled paper or other suitable material crimped to flare outward at its lower edge and bent over at its upper edge 2 to inclose the top portion of a band of cotton-batting 3 or the like, and is there sewed to reduce the thickness of that part of the batting and secure the same within the housing. This difference in thickness of the batting causes the housing to assume the shape shown in the drawings, thereby forming a waterproof covering for the device.

The device is secured to a tree by spreading its ends 5, passing it around the trunk of said tree, and fastening it by small nails or tacks thereto, and when in this position the lower portion of the batting 3 presses firmly against the trunk of the tree, which prevents insects from passing between the housing and said trunk. As seen in Fig. 2, the batting does not reach the lower edge of the housing and the space thus left is covered by a sticky poisonous paste 6, so that when the insect reaches the batting and undertakes to travel farther it comes in contact with this sticky poisonous substance and will be prevented from passing around the lower edge of the housing and reaching the upper surface thereof, and as the sticky substance is of a flavor to induce the insect to eat thereof when having done so it will die from the poisonous effect and fall to the ground unless the said insect is stuck in the substance. This feature of the device prevents it from becoming clogged by the constant accumulation of insects upon its sticky surface, which would deteriorate its usefulness. Such a sticky substance is formed by a compound of castor-oil and resin combined in such proportions as to make an extremely sticky mass, to which is added a small quantity of corrosive sublimate.

The housing may be made of such a color as to correspond with the color of the tree upon which it is to be secured, and this will decrease its prominence and render it less objectionable, and as the sticky surface and batting are covered and hidden by the housing it will be obvious that a neat and efficient device is thereby provided, which, on account of the weatherproof character of the housing, will last indefinitely, always presenting the same neat appearance and effectually preventing the ascent of insects from the ground to the branches and leaves of a tree.

Having thus fully described my invention, what I claim as new and useful is—

1. In a device of the character described, a crimped housing adapted to be secured around the trunk of a tree, a strip of cotton-batting increased in thickness toward its lower edge and terminating above the lower edge of the housing, supporting the housing and causing it to flare, and a poisonous material applied to the under side of the housing below the batting, as and for the purpose described.

2. In a device of the character described, a crimped housing, a lining consisting of batting increased in thickness toward the lower edge, terminating above the lower edge and below the upper edge of the housing, said upper edge being folded over the batting and stitched thereto, and a poisonous material applied to the under side of the housing below the cotton-batting, as and for the purpose described.

In testimony whereof I have hereunto affixed my signature in the presence of two subscribing witnesses.

HARRY H. BELKNAP.

Witnesses:
S. S. WILLIAMSON,
SAMUEL L. TAYLOR.